United States Patent [19]
Couture

[11] Patent Number: 5,779,886
[45] Date of Patent: Jul. 14, 1998

[54] MEDIA FOR FILTRATION

[76] Inventor: Real Couture, 2426 Du Buran, Varennes, Quebec, Canada, J3X 1L2

[21] Appl. No.: 735,888

[22] Filed: Oct. 23, 1996

[51] Int. Cl.$^6$ ........................................ B01F 3/04
[52] U.S. Cl. ................ 210/150; 261/DIG. 72; 261/94; D23/4
[58] Field of Search .................. 210/150, 151; 261/DIG. 72; D23/4

[56] References Cited

U.S. PATENT DOCUMENTS

| | | | |
|---|---|---|---|
| D. 243,531 | 3/1977 | Strigle, Jr. | D23/4 |
| 1,173,187 | 2/1916 | Hechenbleikner | 261/DIG. 72 |
| 1,947,777 | 2/1934 | Huff et al. | 261/94 |
| 2,212,932 | 10/1940 | Fairlie | 261/94 |
| 2,709,128 | 5/1955 | Krause | 261/DIG. 72 |
| 3,266,787 | 8/1966 | Eckert | 261/94 |
| 3,506,248 | 4/1970 | Starbuck et al. | 261/94 |
| 3,914,351 | 10/1975 | McKeown et al. | 261/98 |
| 3,957,931 | 5/1976 | Ellis et al. | 261/DIG. 72 |
| 4,067,936 | 1/1978 | Ellis et al. | 261/98 |
| 4,122,011 | 10/1978 | Strigle, Jr. | 210/150 |
| 4,195,043 | 3/1980 | Foote et al. | 261/94 |
| 4,284,503 | 8/1981 | Stahler | 210/150 |
| 4,318,810 | 3/1982 | Stahler | 210/150 |
| 4,385,988 | 5/1983 | Hypponen | 210/150 |
| 4,511,519 | 4/1985 | Hsia | 261/DIG. 72 |
| 4,668,442 | 5/1987 | Lang | 261/DIG. 72 |
| 4,956,082 | 9/1990 | Choi | 210/150 |
| 5,498,376 | 3/1996 | St. Louis et al. | 261/DIG. 72 |
| 5,543,039 | 8/1996 | Odegaard | 210/150 |
| 5,580,644 | 12/1996 | Minami | 210/150 |

Primary Examiner—Cynthia L. Nessler

[57] ABSTRACT

A media suitable for trickle filters and biological treatment of effluent or sewage wherein the media comprises an elongated member having a center core, a plurality of axially extending ribs and a plurality of fins extending outwardly from each rib, and a plurality of outwardly extending vanes situated at the distal end of each rib. The media element can be used either in a horizontal or vertical orientation and when made of a flexible material can be formed into a twisted configuration.

8 Claims, 1 Drawing Sheet

MEDIA FOR FILTRATION

BACKGROUND OF THE INVENTION

The present invention relates to a media and more particularly relates to a media suitable for use in applications such as aerating or trickle filter towers, biological treatment of effluent or sewage, etc.

The use of media in fluid—fluid systems including fluid-gas systems is well known in the art. In one type of system, one can have a tower or other structure which contains the fluids to be brought in contact, usually with the liquid flowing downwardly and a gas flowing upwardly.

Other uses for media include what are known as rotating biological contactors which are devices for biologically treating an effluent. The media is moved into and out of contact with the waste water. In this process, bacteria grow on the media and the continual cycling into and out of contact with the waste water allows the bacteria to use the oxygen in the air to consume the organic contaminants in the waste water.

Typically, rotating biological contactors have utilized plastic sheets attached to a shaft which rotates such that a portion of the media is immersed in the waste water; as the shaft rotates, the immersed portion is brought into contact with the air (oxygen).

Typically, the media used have been either fixed discs or in some cases, a random media which may be held in place is employed. While it has been well understood that it is desirable to maximize the surface area in contact with the effluent, many of the proposals to date do not maximize the efficiency of the unit.

SUMMARY OF THE INVENTION

It is an object of the present invention to provide a multi use media which may be inexpensively prepared and which can be utilized in different settings.

It is a further object of the present invention to provide a media which may be used in rotating biological contactors.

According to one aspect of the invention, there is provided a media comprising an elongated member, the elongated member having a center core, a plurality of axially extending ribs, a plurality of fins extending outwardly from each rib, and a plurality of vanes situated at the free end of said rib.

The media element of the present invention may be manufactured from any suitable material and a preferred embodiment includes a plastic material such as polyethylene, polystyrene, polypropolyene, polyvinylchloride, etc. It may be formed by any suitable means such as extrusion, injection molding, vacuum forming, etc.

The media element is formed as a longitudinally extending tube and may come in any convenient length. It may, for example, be formed as a continuous extrusion and cut into desired lengths.

The media element has the advantage that may be used in both the horizontal and vertical orientation—in a typical rotating biological contactor, it will generally be used with the longitudinal axis of the element being parallel to the surface of the tank containing the effluent while in an arrangement where it could be used in percolating or trickling filters or absorption towers, it can be used in a vertical orientation. Furthermore, the element may be "twisted" so as to provide a slightly helical or arcuate path within a vertical orientation.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
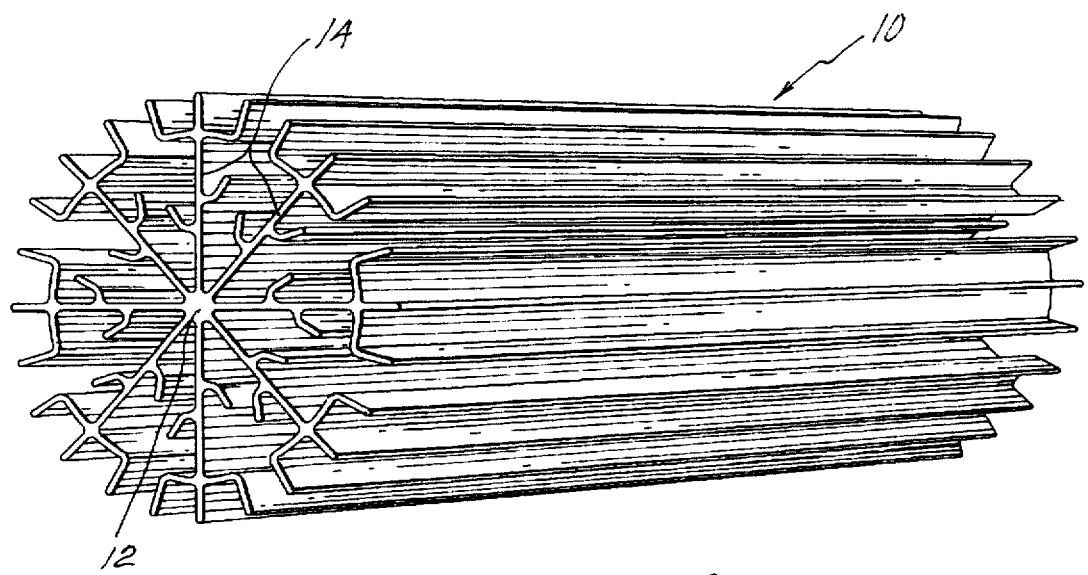
FIG. 1 is a perspective view of a media element according to the present invention.
Figure 2:
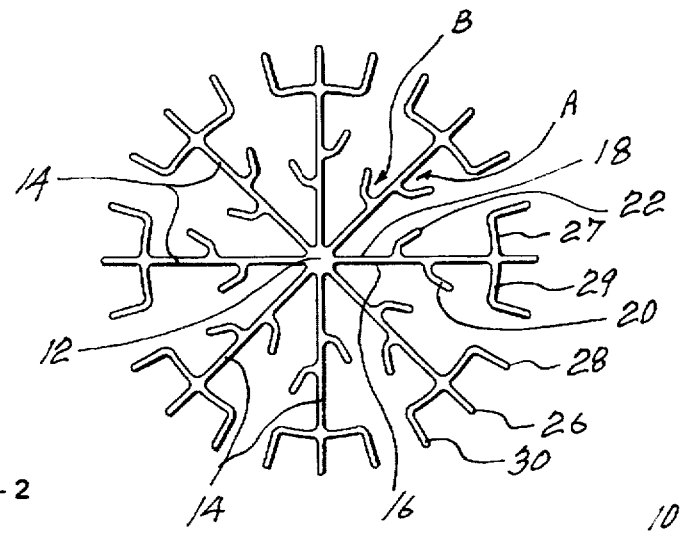
FIG. 2 is a cross sectional view thereof.

Referring to the drawings in greater detail and by reference characters thereto, the media element of the present invention is generally designated by reference numeral 10. As previously mentioned, media element 10 may be formed in any suitable length according to the particular requirements of the element.

Media element 10 includes a solid central core 12 and which has a plurality of ribs 14 extending outwardly therefrom in an axial direction. As may be seen, there are eight ribs in the illustrated embodiment; a greater or lesser number may be used although the number is important for reasons which will be discussed hereinbelow. Preferably between 6 and 10 such ribs are utilized.

Since each rib 14 is substantially identical, only one will be described in detail herein. As may be seen, rib 14 has a pair of opposed sides 16 and 18. Extending outwardly from first side 16, again in an axially extending direction, is a first fin 20. Fin 20 is angularly oriented with respect to rib 14 and thus forms an angle generally designated by reference character A between first side 16 and fin 20.

In a similar manner, second side 18 has a fin 22 extending outwardly therefrom in an axially extending direction. As was the case with first fin 20, second fin 22 forms an acute angle B between second side 18 and fine 22.

Proximate the end of rib 14, there are provided first and second outwardly extending portions 27 and 29 and which extend substantially perpendicular from first side 16 and second side 18 respectively of rib 14. It will be noted that sections 27 and 29 may be slightly arcuate in configuration.

Rib 14 terminates in a center vane portion 26 while end vanes 28 and 30 are parallel to center vane 26 and extend outwardly from sections 27 and 29.

Figure 3:
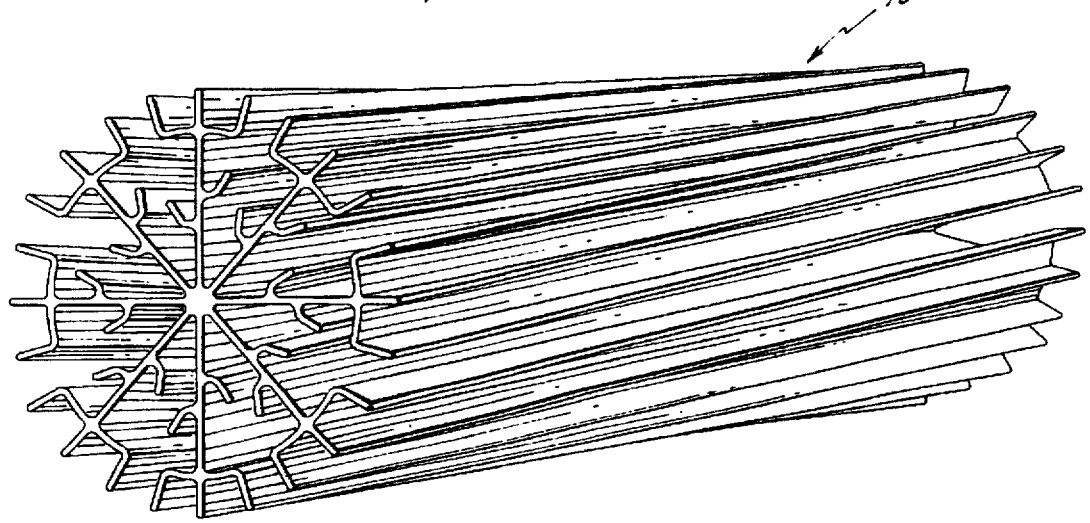
FIG. 3 is a view similar to FIG. 1 illustrating the media when in a "twisted" configuration.

As will be seen from the above, there is provided a media element which may serve in both horizontal and vertical directions. As illustrated in FIG. 3, when the element is made of a sufficiently flexible material, it may form a twisted configuration or such that the ribs 14 have a slightly helical configuration with respect to central core 12 such that channels formed between fins 20, 22 and rib 14 and also by the vane would not form a straight path thus encouraging the contact of liquid with the media element.

The angles A, B and C are also important in certain aspects of the invention. This angle is preferably small (less than 60% and preferably 45% or less) such that when the media element is used in the treatment of wastewater, it provides an area where anaerobic bacteria may build up. This can help in the treatment of the wastewater wherein both aerobic and anaerobic bacteria can exist.

It will be understood that the above described embodiment is for purposes of illustration only and that changes and modifications may be made thereto without departing from the spirit and scope of the invention.

I claim:

1. A media element comprising an elongated member, said elongated member having a center core, a plurality of ribs extending radially outwardly from said center core, a plurality of fins extending outwardly from each rib, and a plurality of outwardly extending vanes situated at a distal end of each of said ribs, said vanes of each rib being spaced from adjacent ribs to thereby provide longitudinally extending circumferential openings.

2. The element of claim 1 wherein said element is formed of a flexible plastic material.

3. The element of claim 2 wherein said material is polyvinylchloride.

4. The element of claim 1 wherein there are between 6 and 10 outwardly extending ribs.

5. The element of claim 4 wherein there are 8 axially extending ribs.

6. The element of claim 1 wherein said fins extend outwardly from said ribs to form an acute angle with respect thereto, said acute angle being less than 60°.

7. The element of claim 6 wherein said acute angle is less than 45°.

8. The element of claim 1 wherein each of said ribs has a slightly helical configuration with respect to said center core.

* * * * *